United States Patent
Sunavala et al.

(10) Patent No.: US 10,219,168 B2
(45) Date of Patent: Feb. 26, 2019

(54) METHODS AND SYSTEMS FOR INTELLIGENT MOBILE FUNCTION DISTRIBUTION

(71) Applicant: Futurewei Technologies, Inc., Plano, TX (US)

(72) Inventors: Farhad Sunavala, San Ramon, CA (US); Mehdi Frederic Sif, San Francisco, CA (US)

(73) Assignee: Futurewei Technologies, Inc., Plano, TX (US)

( * ) Notice: Subject to any disclaimer, the term of this patent is extended or adjusted under 35 U.S.C. 154(b) by 329 days.

(21) Appl. No.: 14/752,370

(22) Filed: Jun. 26, 2015

(65) Prior Publication Data

US 2015/0382242 A1 Dec. 31, 2015

Related U.S. Application Data

(60) Provisional application No. 62/019,205, filed on Jun. 30, 2014.

(51) Int. Cl.
*H04W 24/02* (2009.01)
*H04W 24/08* (2009.01)

(52) U.S. Cl.
CPC .......... *H04W 24/02* (2013.01); *H04W 24/08* (2013.01)

(58) Field of Classification Search
CPC ....................................................... H04J 1/00
USPC ....................................................... 370/254
See application file for complete search history.

(56) References Cited

U.S. PATENT DOCUMENTS

| | | | |
|---|---|---|---|
| 2011/0154491 A1* | 6/2011 | Hernacki | G06F 21/568 726/23 |
| 2012/0249741 A1* | 10/2012 | Maciocci | G06F 3/011 348/46 |
| 2013/0083726 A1* | 4/2013 | Jain | H04W 28/0215 370/328 |
| 2013/0091285 A1* | 4/2013 | Devarakonda | G06F 9/4856 709/226 |
| 2015/0019686 A1* | 1/2015 | Backholm | H04L 47/32 709/217 |

FOREIGN PATENT DOCUMENTS

| | | |
|---|---|---|
| CN | 103516754 A | 1/2014 |
| CN | 103607430 A | 2/2014 |
| CN | 103703724 A | 4/2014 |
| EP | 2922238 A1 | 9/2015 |

OTHER PUBLICATIONS

International Search Report received in Application No. PCT/CN2015/082891, dated Oct. 15, 2015, 10 pages.

* cited by examiner

*Primary Examiner* — Dang T Ton
(74) *Attorney, Agent, or Firm* — Slater Matsil, LLP

(57) ABSTRACT

A method and a system for intelligent mobile function distribution are disclosed. An embodiment includes discovering, by an Intelligent Mobile Function Distribution (iMOD) entity, resources available in a mobile network and moving mobile functions across the mobile network in accordance with the discovered resources, thereby allowing the mobile network to adapt to changing conditions.

10 Claims, 12 Drawing Sheets

| DEVICE NAME | FEEDER | REPORTING FEEDER | NATIVE CAPABILITIES | HOSTED CAPABILITIES | NETWORK FUNCTIONS AVAILABLE | IDENTIFIERS |
|---|---|---|---|---|---|---|
| MME-1 | Y | | MME | MME | | Datacenter ID, IP Address, GUMMEI,TAIs |
| MME-2 | Y | | MME | SGW | | Datacenter ID, IP Address, GUMMEI,TAIs |
| SGW | Y | | SGW | SGW | DPI,PCEF | Datacenter ID, IP Address, TAIs |
| PGW | Y | | PGW | PGW | DPI,PCEF | Datacenter ID, IP Address, |
| eNB-1 | N | MME-2 | eNB | SWG/PGW | OFFLOAD | Datacenter ID, Global eNB-ID, TAI |
| eNB-2 | N | MME-2 | eNB | MME | | Datacenter ID, Global eNB-ID, TAI |
| PGW-LB | Y | | LB | LB | | Datacenter ID, IP ADDRESS |

FIG. 9

```
<Quidway>MME1:
<Quidway-mme1>
<Quidway>allpgw:
<Quidway-allpgw>
<Quidway>all:
<Quidway-all>
```

FIG. 10A

```
// Define access-list for all phone numbers beginning with 1408*
<Quidway>access-list msisdn-408
 <Quidway-nacl>permit msisdn 1408*
<Quidway-nacl>exit
<Quidway>access-list imsi -USA // Define access-list for all US SIMs
<Quidway-nacl> permit imsi 310*
<Quidway-nacl>exit
<Quidway>route-map  mmelb-localeNB permit 10
//trigger action for feeder element
<Quidway-routemap>match access-group imsi-USA
 //action by presenter after getting trigger notification from feeder
<Quidway-routemap> set mme { device-name: | local-eNB }
<Quidway-routemap>notify
<Quidway-routemap>exit
// Finally, apply route-map on MME Loadbalancer feeder
<Quidway>mmelb:
<Quidway-mmelb:>policy-map mmelb-localeNB
<Quidway-mme:>exit
```

FIG. 10B

```
E.g.
for (i=0; i < NUM_FEEDERS; i++) {
  if (feeder[i].type == "MMELB") {
    if (strncmp(subs.imsi, "310*", 4) == 0) {
      /*
       * Build access-list and route-map "foo"
       */
      imod_api_set_trigger(feeder, foo);
    }
  }
}
```

METHODS AND SYSTEMS FOR INTELLIGENT MOBILE FUNCTION DISTRIBUTION

This application claims the benefit of U.S. Provisional Application No. 62/019,205, entitled "Methods and Systems for Intelligent Mobile Function Distribution," filed on Jun. 30, 2014, which application is hereby incorporated herein by reference.

TECHNICAL FIELD

The present invention relates to telecommunications, and, in particular embodiments, to Methods and Systems for Intelligent Mobile Function Distribution.

BACKGROUND

As the industry moves from 4G to 5G, with ever-increasing access speeds, the basic mobility principle of backhauling all traffic to a stable anchor point (PGW) is being severely challenged. In addition, events which lead to the mass migration of people from big cities for big events (e.g., the Sochi Olympics) lead to unique mobility problems as far as RAN access and backhaul go. Future steps in the mobile world could be based on two main requirements. The first of which being how to support mobility of network functions between different locations in order to adapt to different deployment options. The second being how to support different sets of functionalities by means of SW over the same generic hardware.

SUMMARY

In accordance with an embodiment of the invention a method comprises discovering, by an Intelligent Mobile Function Distribution (iMOD) entity, resources available in a mobile network, and moving mobile functions across the mobile network in accordance with the discovered resources, thereby allowing the mobile network to adapt to changing conditions.

In accordance with an embodiment of the invention a method comprises assigning, by an Intelligent Mobile Function Distribution (iMOD) entity, a mobile network function such as a local SGW, a local PGW, a local MME, etc. to a base station located remote from a core of a mobile network, and processing, by a base station, user data or control data of a first UE assigned to the base station through the local SGW, the local PGW or the local MME.

In accordance with another embodiment of the invention a method comprises discovering, by an Intelligent Mobile Function Distribution (iMOD) entity, bandwidth constrains in a first geographical location but not in a second geographical location in close proximity to the first geographical location of a mobile network, and dynamically limiting, by the iMOD entity, mobile functions at the first geographical location but not at the second geographical location, thereby allowing the mobile network to adapt to changing conditions.

In accordance with yet another embodiment of the invention a method comprises implementing, by an Intelligent Mobile Function Distribution (iMOD) entity, complex policies which allow a specific mobile function for first users and a different mobile function for second users.

In accordance with yet another embodiment of the invention a method comprises implementing, by an Intelligent Mobile Function Distribution (iMOD) entity, a complex policy comprising an "alpha" policy and a "beta" policy, assigning, by a MME load balancer (MME LB), a first UE to a MME-1 when the first UE satisfies the "alpha" policy, assigning, by the MME LB, a second UE to a MME-2 when the second UE satisfies the "beta" policy, selecting, by the MME-1, a first sub mobile function so that the first sub mobile function processes user data for the first UE, and selecting, by the MME-2, a second sub mobile function so that the second sub mobile function processes user data for the second UE, wherein the first sub mobile function processes the user data for the first UE faster than the second sub mobile function processes the user data for the second UE.

In accordance with a further embodiment of the invention an apparatus comprises a processor and a computer readable storage medium storing programming for execution by the processor, the programming including instructions to discover resources available in a mobile network using an Intelligent Mobile Function Distribution (iMOD) entity, and to move mobile functions across the mobile network in accordance with the discovered resources, thereby allowing the mobile network to adapt to changing conditions.

BRIEF DESCRIPTION OF THE DRAWINGS

For a more complete understanding of the present invention, and the advantages thereof, reference is now made to the following descriptions taken in conjunction with the accompanying drawing, in which:

FIG. 9 illustrates a table of status information according to an embodiment;

FIGS. 10A-10B illustrate instructions in CLI format for embodiment iMOD Policy Configurations;

DETAILED DESCRIPTION OF ILLUSTRATIVE EMBODIMENTS

Figure 1:
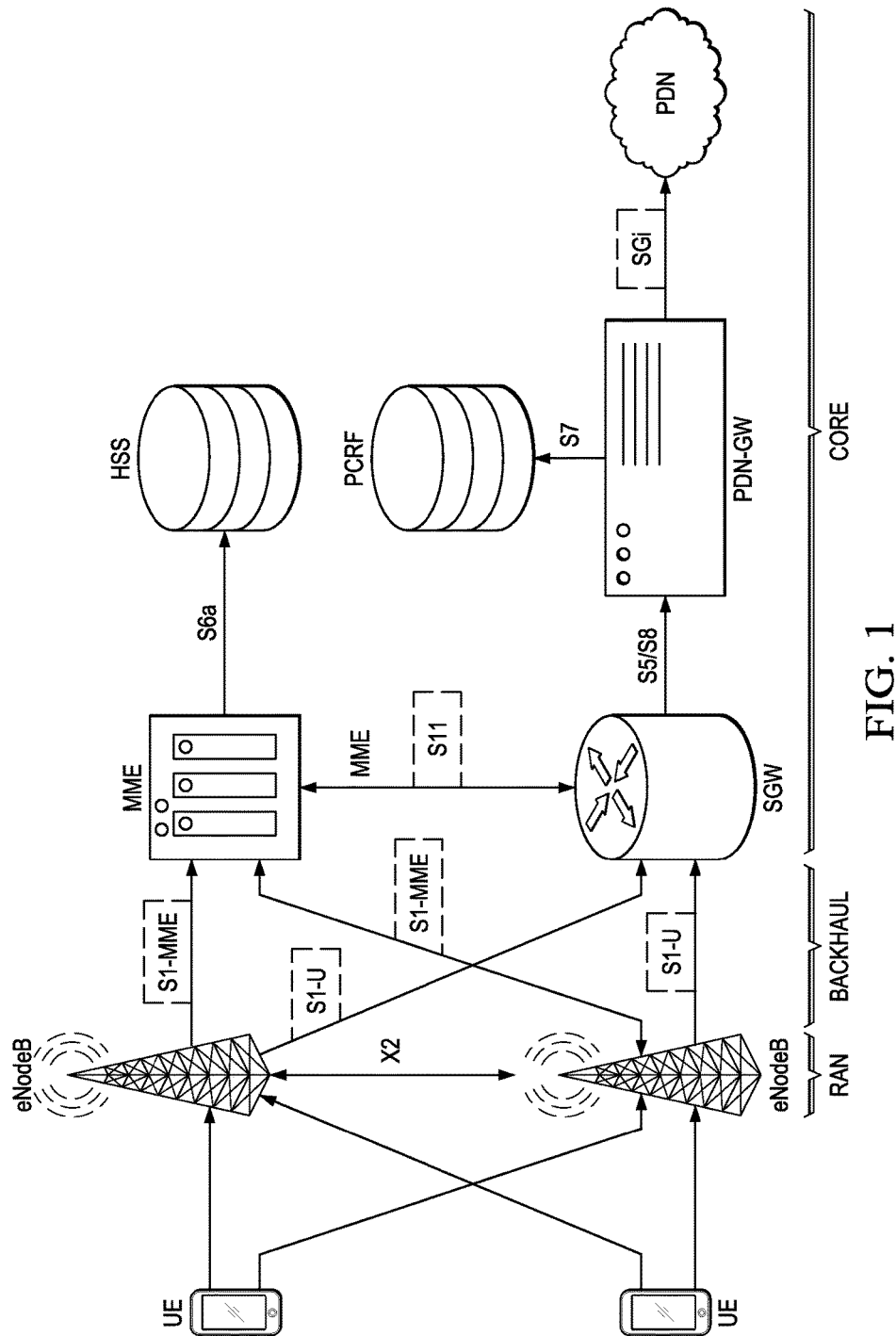
FIG. 1 illustrates a conventional mobile network architecture.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments of this disclosure provide Intelligent Mobile Function Distribution (iMOD) entities that dynamically discover physical and virtual mobile resources available in the mobile operator's network. Embodiment iMOD entities use this information along with operator configured policies to intelligently and dynamically move mobile functions across the operator's network to adapt to different deployment options, changing traffic patterns, lack of resources (e.g., RAN resources, mobile backhaul resources or core resources.).

Embodiment iMOD entities can dynamically discover mobile, physical, and virtual resources in the operator's network, and intelligently move mobile functions across the operator's network based on dynamic traffic pattern, e.g., mass migration of people from populated cities like Moscow, St. Petersburg, etc. to Sochi for the Winter Olympics). Aspects of this disclosure will allow operators to plan ahead as well as to dynamically adapt to varying traffic patterns and implement complex policies. For example, embodiment techniques may assign subscribers that satisfy an "alpha" policy condition to one MME (e.g., MME-1), and assign all other subscribers to another MME (e.g., MME-2). In an embodiment, subscribers satisfying a "beta" policy condition may be assigned to one SGW (e.g., SGW-1), while all other subscribers are assigned to another SGW (e.g., SGW-2). In one example, the "alpha" policy is "US subscribers of ATT" and the "beta" policy is "Chinese subscribers of China Mobile."

Policy and charging rules function (PCRF) is part of the 3GPP specification that is related to policy management. However, PCRF is primarily for policies in the user plane, and may not deal with virtualization and moving mobile functions (physical or virtual) or policies applied in the control plane.

Embodiments of the invention allow mobile network functions to be dynamically and intelligently migrated across a mobile operator's network. Embodiments may use network function virtualization (NFV) techniques provided by operators to lower their capital expenditure costs. In addition, the iMOD entity can monitor the network and intelligently move mobile functions based on dynamic traffic patterns.

Embodiments of the invention may be implemented by mobile operators. Embodiment Intelligent and Dynamic Mobile Network Function Virtualization entities may use NFV techniques initiated by operators to achieve different modes of operation.

In large mobile networks, it may be difficult for a single entity to keep track of each and every mobile function in the network. Embodiments may provide mobile feeder elements and mobile network elements to keep the workloads sufficiently small with respect to individual intelligent entities (iMODs). Embodiment intelligent entity settings may be triggered in mobile network elements. Upon being triggered, the intelligent entity settings may allow the network elements to take actions when the triggers are activated and send notifications back to the intelligent entity upon which the intelligent entity can take further actions based on CLI, scripting, NB API, etc.

FIG. 1 illustrates a conventional mobile network architecture. The architecture comprises a radio access network (RAN) comprising base stations (e.g. eNBs). The base stations communicate with the user equipment (UE). The conventional mobile network further comprises the core (e.g., evolved packet core, EPC). The core comprises, inter alia, an SGW, a PGW and a MME. The RAN is connected to the core (which is typically located in a central data center) by the mobile operators backbone.

Figure 2:
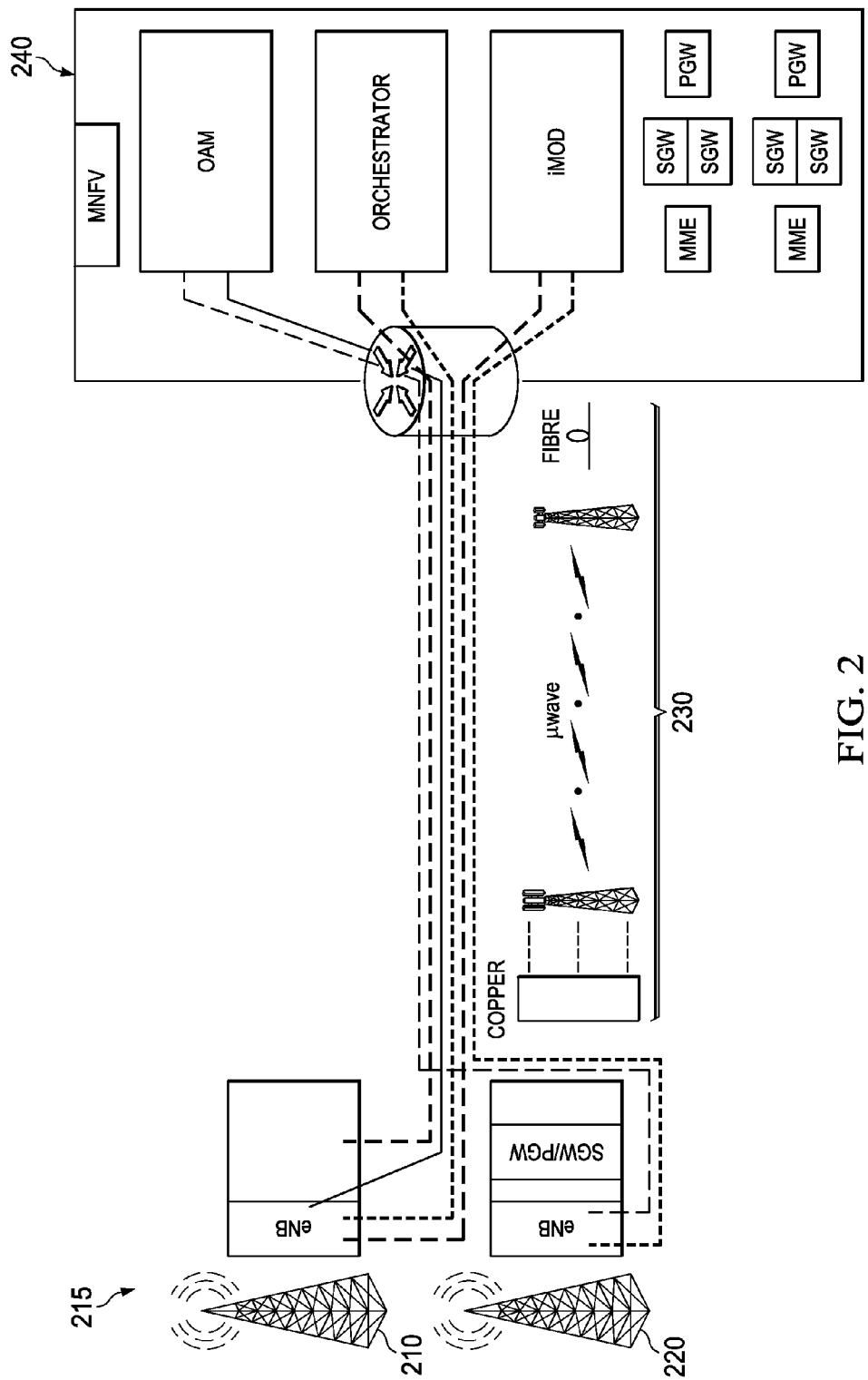
FIG. 2 illustrates generating or assigning SGW and/or PGW to the base station and remote from the core according to an embodiment of the invention.

FIG. 2 illustrates an embodiment of the invention comprising a mobile network architecture that includes an iMOD entity. The iMOD entity may be located at the core of the mobile operator's network (e.g., the central data center). The iMOD entity may be programmable, and may provide the network operator with the capability to move mobile functions across the network. The iMOD entity may move network functions across the network on demand, thereby providing for richer actions, events, and environments. In an embodiment, iMOD entity may provide a flexible environment for provisioning resources, network monitoring, troubleshooting, automation, and extension/expansion.

FIG. 2 shows a first base station 210 (e.g., eNB) and a second base station 220 (eNB). The base stations 210, 220 are part of the radio access network (RAN) 215. FIG. 2 further illustrates the core (e.g., evolved packet core (EPC)) 240 as a data center. The core 240 may comprise Mobility Management Entities (MMEs), Service Gateways (SGWs), and Packat Data Node Gateways (PGWs). The MME handles control data and signaling. The MME manages session states, authenticates and tracks a user across the network. The SGW and the PGW handle user data. The SGW routes data packets through the access network and the PGW acts as the interface between the mobile operator's network and other packet data networks such as the internet backbone. The PGW further manages quality of service (QoS) and provides deep packet inspection (DPI). The core 240 may further comprise an iMOD entity and other entities such as a mobile network function visualization (MNFV) unit, an Orchestrator and an OAM (operation administration and management) unit. Each of these entities or unites may operate on a separate physical hardware resource such as a computer or server. Alternatively, these entities or units may operate on the mobile operator's cloud network.

The core 240 is connected to the RAN 215 via the mobile operator's backhaul 230. The backhaul 230 may comprise switches, routers and other connecting devices. The backhaul 230 further may comprise fiber cables, copper cables or other wire or wireless connecting devices connecting the switches, routers and other connecting devices.

In some embodiment, a SGW, a PGW or a MME may be created at, allocated to, distributed to or assigned to the base stations 210, 220 remote from the mobile operator's core (datacenter) 240. The SGW and the PGW may be created at and assigned to a remote base station 210, 220. In the particular example of FIG. 2, a local SGW and a local PGW are assigned to the base station 220 while no such function is assigned to the base station 210. In some embodiments the SGW and the PGW may be created and deleted based on demand or need (e.g., data traffic reaches a threshold value). In some embodiments after the local SGW, the local PGW or the local MME is assigned to the base station, the local SGW, the local PGW or the local MME is removed from the base station after a time period or after demand drops under a threshold value. Moreover, the iMOD entity may allocate SGWs, PGWs or MMEs to remote base stations or remote pools of base stations (e.g., base stations which are distributed over a limited geographical area remote from the main data center). In some embodiments the remote SGWs, the remote PGWs or the remote MMEs may be created by the iMOD entity using cloud computing network.

The SGWs, the PGWs or the MMEs may be set up as a local physical hardware data center remote from the mobile operator's main data center. The iMOD entity may assign a SGW, a PGW or a MME at the local physical data center to a specific base station or to base stations. The SGW, the PGW or the MME may be dynamically assigned. Alternatively, the iMOD entity may create the SGW, the PGW or the MME from the pool of the remote data center to a specific base station. Similarly, the iMOD entity may turn on/off or initiate the SGW, the PGW or MME at a remote base station.

In alternative embodiments, the iMOD entity may use (cloud) network resources (from the network operator's resource or from resources other than the mobile network operator).

This has the advantages that when a subscriber (user or UE) wants to access information geographically located close to his or her location that the network can be efficiently utilized. Data packets requesting access to information located near the user may leave the mobile operator's network directly at the serving base station (or near the base station) using the remote SGW/PGW instead of traveling all the way to the core (main datacenter) using the SGW/PGW there. The return packets providing the information to the user may (such as video data) also enter the mobile operators network at the serving base station (or near the serving base station) using the SGW/PGW functionality.

One real-world example for the application of iMOD is when networks need to support mass migrations of people (for sports events, for example). The iMOD entity may offload data packets directly at the base station(s) covering the event into the internet backbone for some or most of the subscribers (users) to provide a reasonable bandwidth in the backhaul for other subscribers (users) not attending the event.

Without an iMOD entity, operators may need to make expensive infrastructure upgrades to prepare for large events. By way of example, Megafon (Russia's second largest mobile operator) installed 680 new 2G/3G base stations, 270 4G base stations, and over 220 km of optical communication lines to prepare for the 2014 Sochi Winter Olympics. Some of these infrastructure upgrades were duplicative, and could have been avoided if Megafon had access to iMOD entities provided by the embodiments of this invention.

Without offloading, when a Novosibirsk, Russia, subscriber is in Sochi, Russia, and wants to access a server in St. Petersburg, Russia, the upstream packet travels over the network operator's backhaul to the mobility anchor (PGW) in Novosibirsk (about 2,700 miles) and then over the internet backbone from Novosibirsk to St. Petersburg (about 2,400 miles). The downlink packet travels the return path from St. Petersburg to Novosibirsk (about 2,400 miles) via the internet backbone and from Novosibirsk to Sochi (about 2,700 miles) via the mobile operator's backbone. Altogether, the packets traveled about 10,200 miles. In contrast, with offloading, the uplink and downlink packets leave/enter a base station in Sochi and travel directly to St. Petersburg via the internet backbone which is about 1,500 miles each way.

Accordingly, the packets could have saved about 7,000 miles travel distance. In an embodiment, iMOD may allow operators to dynamically create and/or delete serving gateways (SGW) and/or Packet Data Network Gateway (PGW) based on real-time traffic patterns. This may be performed without changing the mobile operator's network.

Figure 3:
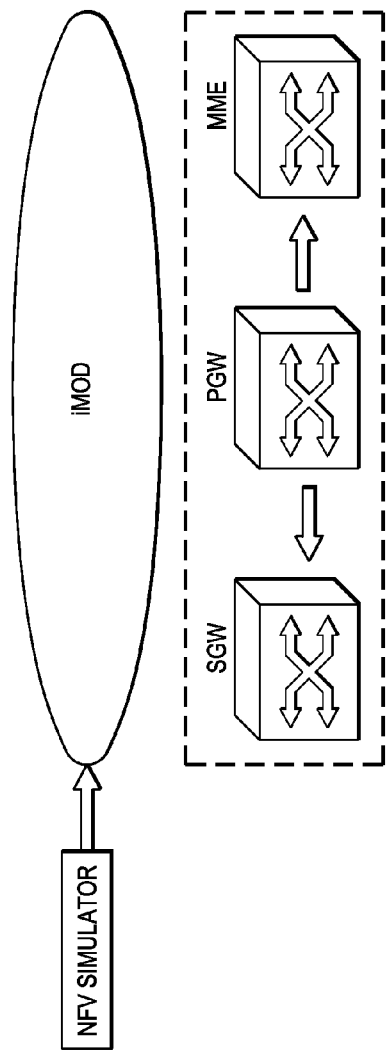
FIG. 3 illustrates moving SGW, PGW and/or MME functionalities towards the edge of the network and away from the core according to an embodiment.

FIG. 3 shows an embodiment of how the SGW, the PGW and the MME are moved from the center of the mobile operator's network (core) to the edge of the mobile operator's network (e.g., to the base stations). This can be done in a dynamic and intelligent way (e.g., using cloud resources). The NFV simulator supports the iMOD entity with network information. The NFV simulator is an entity that constantly receives feedback about the network and then uses the feedback to do predict the network in the future. The NFV simulator may constantly receive data about the load on a particular section of the mobile network. The NFV simulator does a long-term simulation of the data and then concludes that the load is at its maximum at around 6 pm, for example. Based on this simulation, the NFV simulator can direct the iMOD entity to move PGWs or SGWs to all eNBs in that part of the mobile network during that time. The PGWs or SGWs are moved to the eNBs as long as the load is high (e.g., as long as demand requires it). The demand may be high for about an hour to about 3 hours, for example. Afterwards, the iMOD entity may remove the PGWs or the SGWs for all eNBs or for only a portion of the eNBs. The NFV simulator is described in more detail in patent application Ser. No. 14,470,558 entitled "System and Method for Mobile Network Function Virtualization." This reference is incorporated herein by reference in its entirety.

Figure 4A:
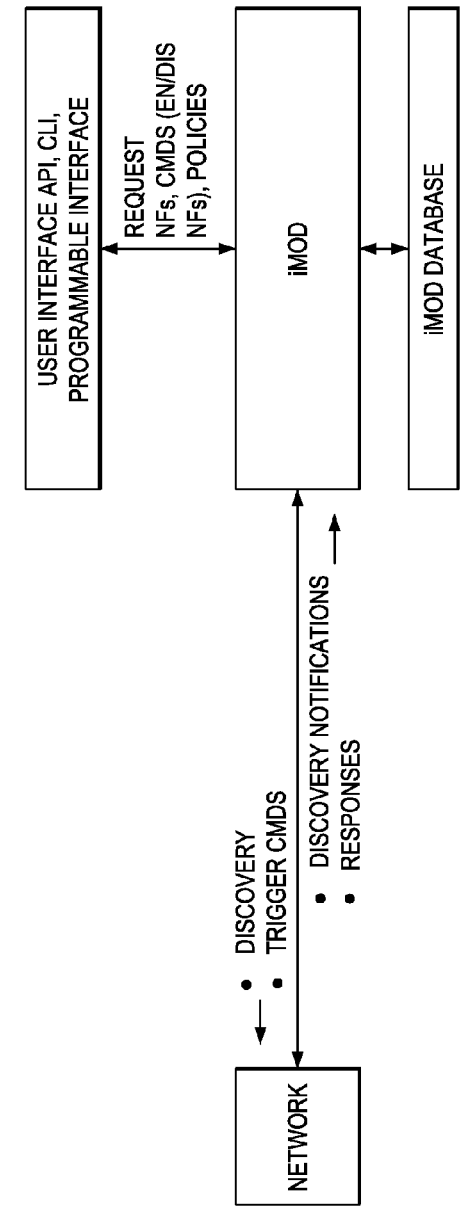
FIGS. 4A-4B illustrate block diagrams showing the iMOD entity and its operation with or without Mobile Network Function Virtualization.
Figures 11, 12:
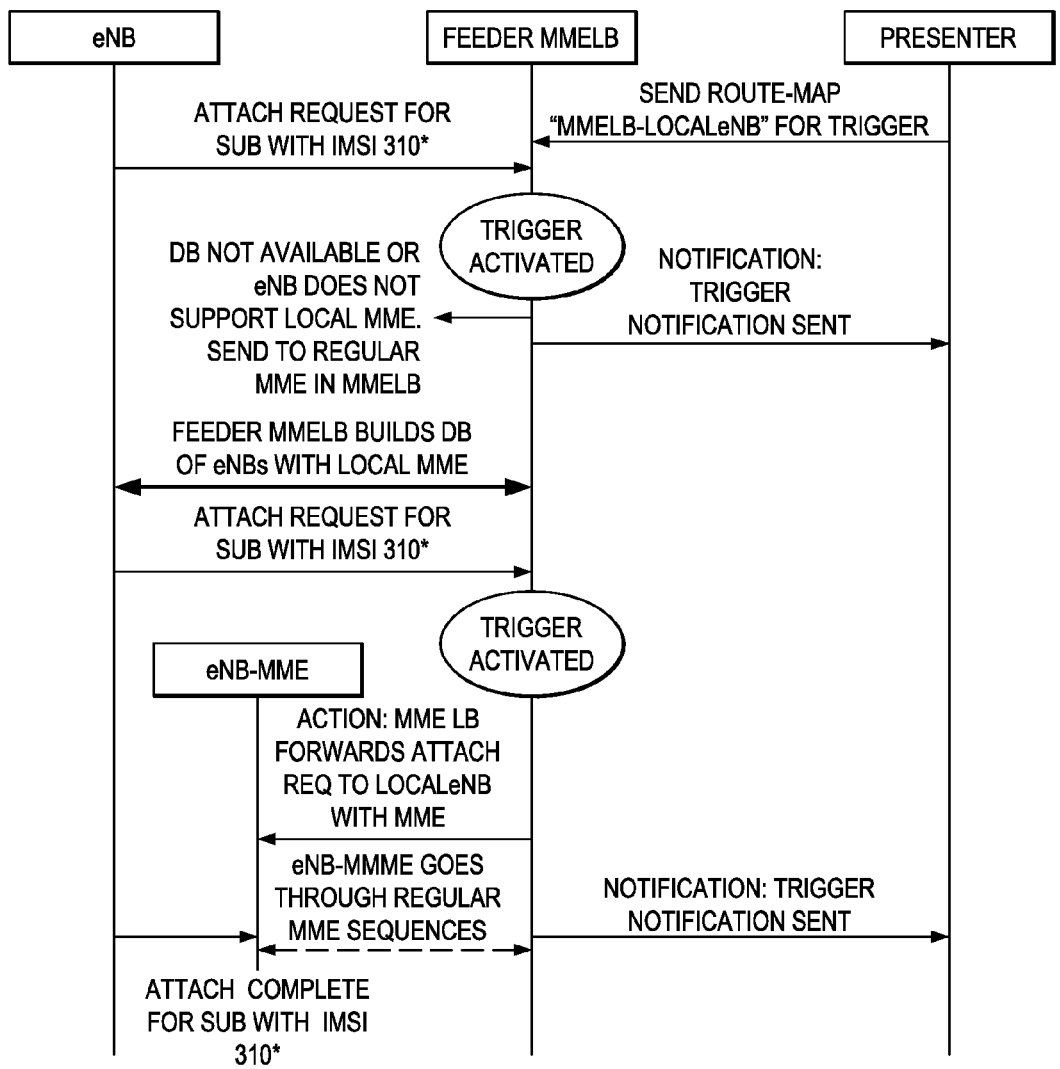
FIG. 11 illustrates a protocol diagram of an embodiment communications sequence for implementing an iMOD policy configuration.
FIG. 12 illustrates instructions in a C format for embodiment iMOD Policy Configuration.

FIG. 4a shows an embodiment how the iMOD entity may operate. In some embodiments the iMOD entity is a control entity and is programmable. The iMOD entity may be connected to and communicates with a user interface and may receive program instructions (such as policies and guidelines) through the user interface. The policy instructions may comprise instructions that subscribers to foreign mobile operators (e.g., China Mobile) get lower priority than subscribers to the mobile operator. The iMOD entity may receive instructions written in CLI format or API format, for example. For example, the iMOD entity may receive policy instructions, as shown in FIGS. 12a and 12b, and stores these instructions in the iMOD database. The iMOD entity is further connected to, communicates with or has an interface with the mobile operator's network. The iMOD entity may receive notifications and information from the network. For example, the iMOD entity may receive status information from the network, as shown in FIG. 11, and stores this information in the iMOD database. The iMOD entity is additionally connected to, communicates with or has an interface with an iMOD database. The iMOD entity receives notifications from the network, receives policy information from the user interface, and provides instructions to and operates the network with information based on stored instructions from iMOD database.

Figure 4B:
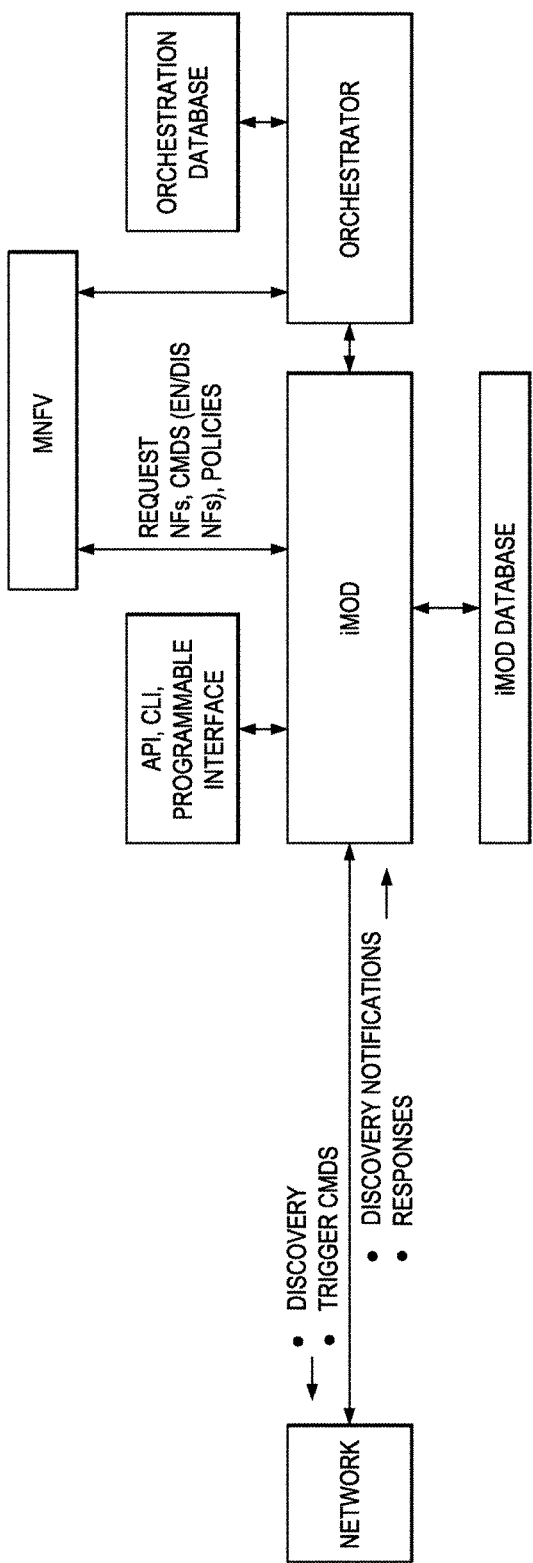

FIG. 4b show an iMOD entity using virtualization. Here, the iMOD entity is further connected to, communicates with or has interfaces with an orchestrator unit and a mobile network function virtualization (MNFV) unit. The orchestrator unit may further be connected to an orchestrator database. The MNFV unit knows where the virtual functions are available in the network while the orchestrator unit activates these virtual functions. For example, if the iMOD entity wants to utilize a virtual function at a base station (e.g., a SGW at eNB1) it requests activation of this function from the orchestrator unit and the orchestrator unit actives the function so that the iMOD entity can allocate tasks or activities to this function.

Figure 5:
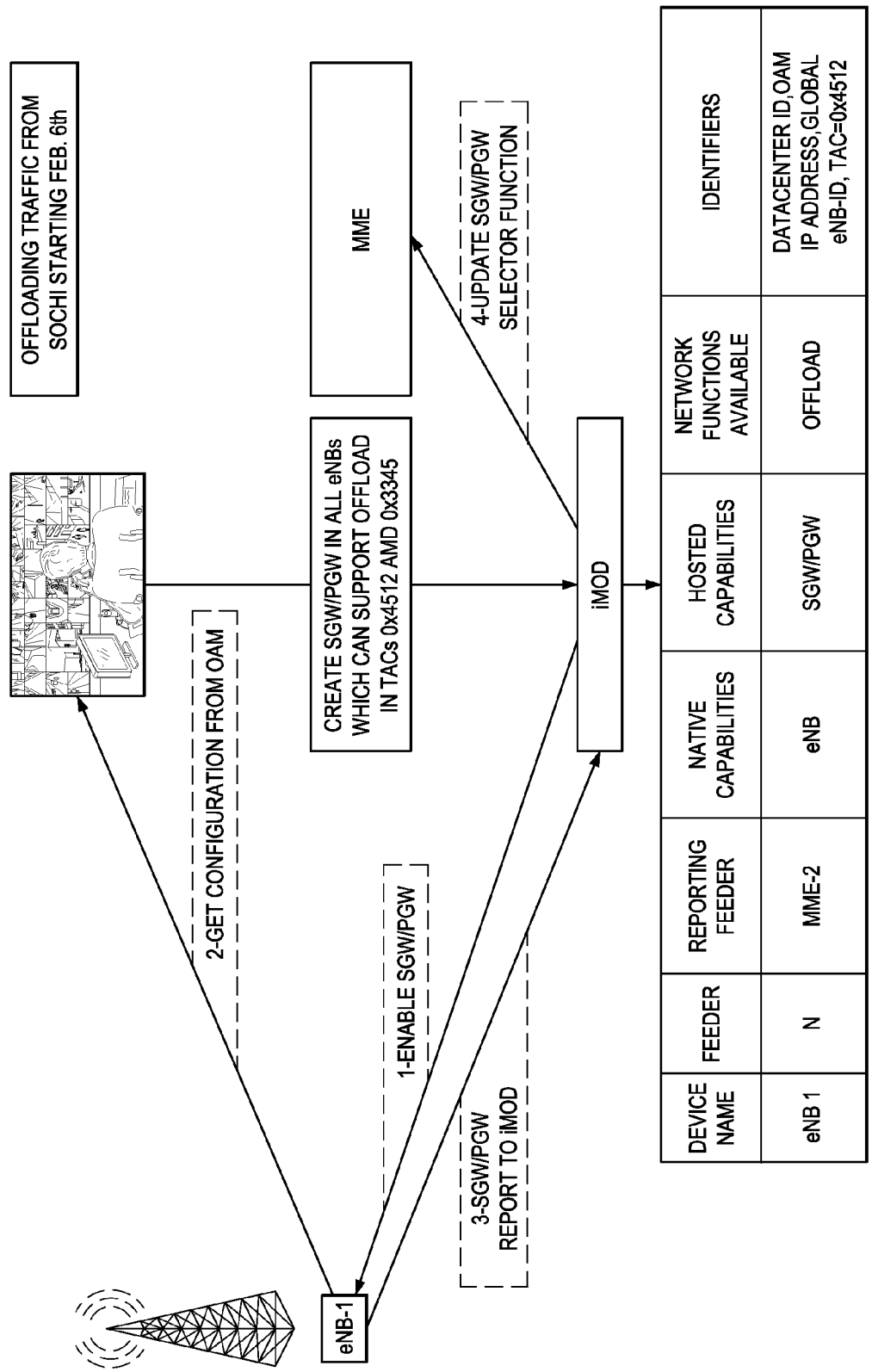
FIG. 5 illustrates a policy instruction to a base station by an iMOD entity.

FIG. 5 shows an embodiment of how the iMOD creates or assigns SGW/PGW functions at/to base station(s) (e.g., eNB-1). The iMOD entity is programmed with or receives information from the operator (via the user interface) about mass migration to an event for base station(s) covering this specific geographical location (e.g., Sochi). The iMOD entity creates or enables SGW/PGW functions at the base stations covering Sochi (e.g., enable SGW/PGW at base station eNB-1). After doing so, the base station(s) (e.g., eNB-1), in an optional step, may request or receive confirmation from the OAM unit that mass migration to the event takes place. The base station (eNB-1) or base stations report the creation or enablement of the SGW(s) and PGW(s) to the iMOD entity. Then the iMOD entity notifies the MME about the SGW/PGW capabilities of the respective base station(s) (eNB-1) and the MME updates its SGW/PGW selector function. After generating the SGW/PGW gateway at the base station(s) the system can offload data traffic to the internet backbone directly at the base station(s) in Sochi.

Figure 6:
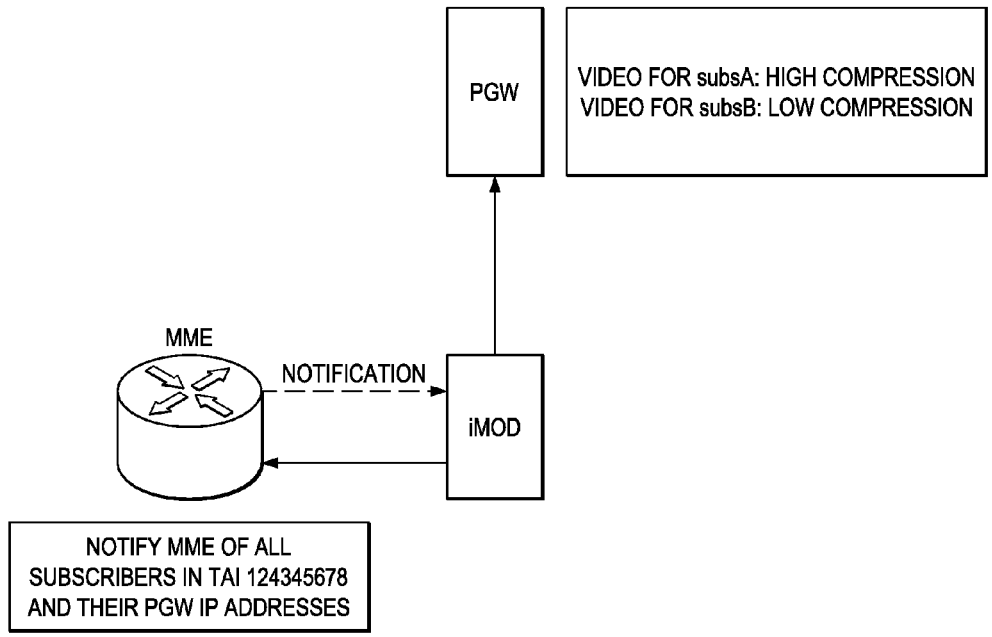
FIG. 6 illustrates a policy instruction to selectively increase data compression for users assigned to a PGW but located in different geographical locations by an iMOD entity locations according to an embodiment.

FIG. 6 shows an embodiment of how the iMOD entity instructs the MME and the PGW to deal with video data traffic when many subscribers (users) gather at a specific (first) location (e.g., a sports stadium). The iMOD entity instructs the MME of the first location where a mass crowding is expected (e.g., a sports event). The MME reports all subscribers gathering at the first location to the iMOD entity and the iMOD entity notifies the PGW of these subscribers so that the PGW automatically increases compression for these subscribers at the first location. This can be achieved through signaling between the iMOD entity, the MME, and the PGW.

In an embodiment, the MME notifies the iMOD entity about the subscribers (e.g., users) located in the first geographical location (e.g., a stadium). The iMOD entity determines the available bandwidth for this geographical location and notifies the PGW so that the PGW can adjust the compression of data for users located in the first geographical location. For example, the PGW may provide a high compression for video data when users located in the first geographical location send or receive a video data (e.g., streaming or live streaming video data). Accordingly, the users in this location can only send or see low quality videos because the iMOD entity instructed the PGW that the data must be compressed with a high compression factor. However, subscribers in other locations are not affected by this policy. Even subscribers located at a second location, in close proximity of the even (e.g., stadium), may still be able to receive and send video data compressed with a low compression factor or a regular compression factor. Accordingly these users can send and see regular quality video.

The iMOD entity may adjust the compression of video data gradually. If there are 30,000 users gathering at the first geographical location the compression factor is high (e.g., about 30), if there are only 10,000 users gathering at the stadium the compression factor may still be higher than normal but not as high as when there are 30,000 users gather (e.g., the compression factor is about 10). Accordingly, the compression factor is a factor of 5-10 times or 3-5 times higher than the regular compression factor.

In some embodiments the PGW compresses or instructs to compress the video data of at the first location with a high compression factor. The iMOD may dynamically instruct the PGW to compress or to instruct to compress the video data with a lower compression factor in the first location when the bandwidth constrains have eased or with a higher compression factor when the bandwidth constrains have increased. A video optimizer may perform the compression. The video optimizer may be a entity separate from the PGW or may be integrated in the PGW. The PGW may control the video optimizer or may instruct the video optimizer with what compression factor the video data should be compressed.

Figure 7:
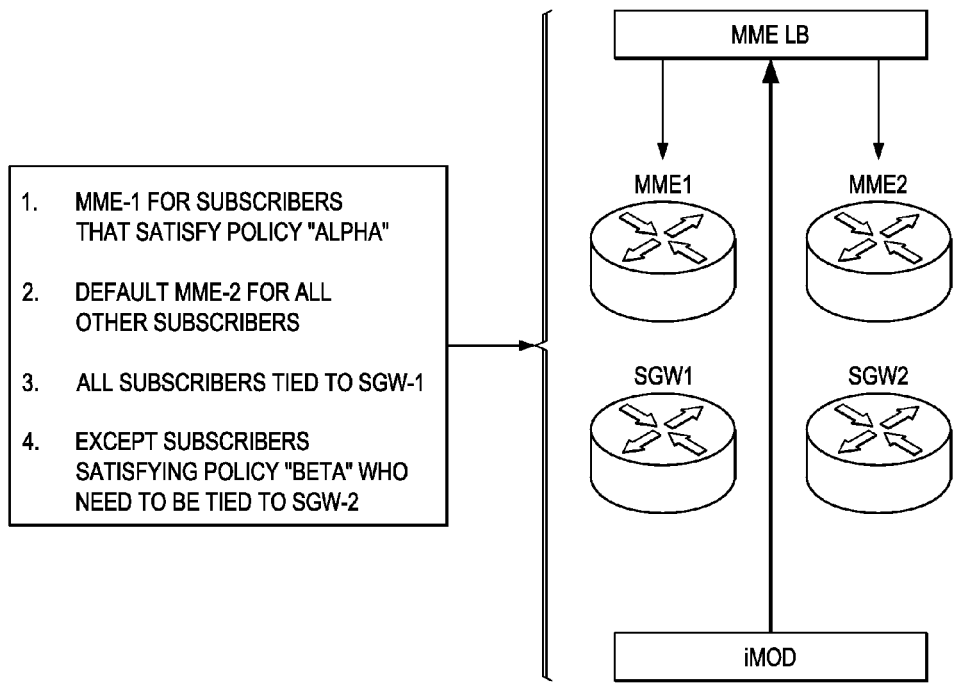
FIG. 7 illustrates a policy instruction to assign users (UE) with different priorities to different MMEs according to an embodiment.

FIG. 7 illustrates an embodiment of the system executing complex policies via the iMOD entity in a mobile telecommunications system. The subscribers may be grouped in several groups and allocated to different MMEs. In an embodiment the MME is divided into two MMEs, MME-1 and MME-2. Subscribers that satisfy policy "alpha" may be allocated to MME-1 and all other ("beta") subscribers may be allocated to MME-2. Subscribers fulfilling policy "alpha" may be treated with a higher priority than the "beta" subscribers. For example, "alpha" subscribers may get more bandwidth than the "beta" subscribers or a higher guaranteed bandwidth even when the network is crowded or congested. In some embodiments the "alpha" subscribers are tied to SGW-1 and the "beta" subscribers are tied to SGW-2. In some embodiments the "alpha" subscribers are subscribers of a national or local network provider (e.g., AT&T®) and "beta" subscribers are subscribers of a foreign or other network provider (e.g., China Mobile). In alternative embodiments the "alpha" subscribers are subscribers paying for a premium plan while the "beta" subscribers are subscribers paying for a basic plan. The partition may be more than two. For example, there may be three, four and more categories of MMEs and/or SGWs.

In some embodiments, the subscribers may be tied to other subgroups of mobile functions. For example, MME-1 may be linked to PGW-1 (or SGW-1 and PGW-1) and MME-2 may be linked to PGW-2 (or SGW-2 and PGW-2).

In an example, the iMOD entity instructs the MME load balancer (MME LB) about the following complex policy: Assigning AT&T® users to MME-1 and assigning China Mobile users to MME-2. This can be done by instructing the MME selector in the MME LB as follows: access-list msisdn-us=att permit msisdn 310150*; access-list msisdn-china-cmcc permit msisdn 46000*; access list catch all permit msisdn att; route-map complex policy permit 10 match access-group msisdn-us-att set mme MME-1 notify; route-map complex-policy permit 20 set mme MME-2. The iMOD entity may further instruct the SGW selector in the MME-1 to select SGW-1 and the SGW selector in MME-2 to select SGW-2. The instruction may be as follows: access-list msisdn-china-cmcc permit msisdn 46000*; route-map complex-policy permit 10 match access-group msisdn-china-cmcc set sgw SGW-2; route-map complex-policy permit 20 set sgw SGW-1 notify.

The embodiments of FIGS. 2, 6 and 7 may be combined. For example, at a location of mass migration, the "alpha" subscribers can watch high quality video because the PGW for these subscribers is moved to the base station(s) covering the location. Accordingly, local PGW adds data to or removes data from the mobile operator's network right at the base station. Therefore, a high data rate can be provided. In contrast, the PGW for the "beta" subscribers may still be located at the core (main data center) so that their data must travel through the congested mobile operator's backhaul. To release pressure from the mobile operator's network the video data of the "beta" subscribers may be highly compressed or, alternatively, may not be available at all (e.g., the "beta" subscribers cannot send or receive video data).

Figure 8:
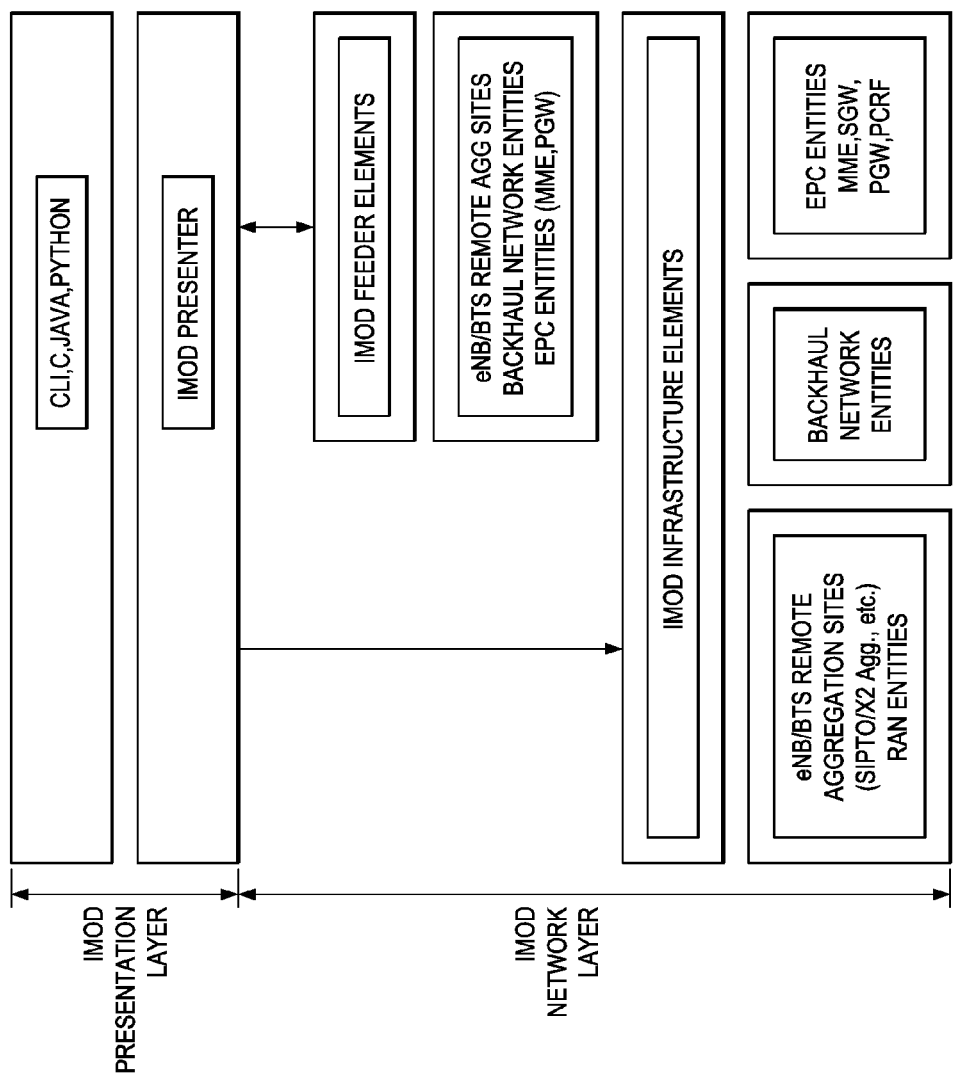
FIG. 8 illustrates an iMOD architecture according to an embodiment.

FIG. 8 illustrates an embodiment iMOD architecture. The iMOD architecture may comprise an iMOD presentation layer and iMOD network layer. The iMOD presentation layer may include an iMOD presenter, e.g., a programmable graphical user interface. It can be programmed using API, CLI, programming language such as C or Python, for example. The iMOD presenter may receive and show information provided by the iMOD feeder elements. The iMOD feeder elements may be RAN entities (such as base stations), backhaul network entities and EPC entities that cover the area of interest. For example, if the Super Bowl takes place in Santa Clara only the RAN entities, backhaul network entities and EPC entities related to Santa Clara are of interest and therefore should report activities. Other entities should not report activities to iMOD so that the information received by the iMOD entity is not distorted by data not related to the event and the amount of data to be processed can easily be handled. The information data provided by the iMOD feeder elements are processed by the iMOD entity and instructions are sent to the iMOD infrastructure elements (e.g., RAN entities, backhaul network entities and EPC entities). The instructions may only be sent to iMOD infrastructure elements of interest, e.g., elements that can handle iMOD instructions and that are related to an event. For example, iMOD infrastructure elements may only be elements that have 4G and 5G capabilities (e.g., not 2G or 3G elements) and that can handle iMOD instructions. The iMOD infrastructure elements may preferably be those located in the area of or related to the area of the event, e.g., Santa Clara.

FIG. 9 illustrates a table of status information received from feeder elements according to an embodiment. FIG. 9 shows information that the iMOD entity receives or collects from the mobile operator's network. In particular, the information is provided by the iMOD infrastructure feeder elements (such as RAN entities, backhaul network entities and EPC entities). Only relevant entities may provide this information. The information may be stored in the iMOD database. FIG. 9 shows that the eNB-1 hosts SGW/PGW functions but no MME function and that the eNB-2 hosts the MME function but no SGW/PGW functions. Accordingly, eNB-1 may provide a fast data connection and eNB-2 may provide a fast signaling connection. When a user is driving a car and moving from the eNB1 to eNB2 his or her connection may switch from a fast data connection (and a slow signaling connection) to a fast signaling connection (and a slow data connection). In other embodiments, the eNB-1 and eNB-2 both host MME and SGW/PGW functions providing fast data and fast signaling connections. In some embodiments the user may move from an area which is supported by iMOD to an area which is not supported by iMOD. Accordingly, the user may move from a fast data/signaling connection to a slow data/signaling connection.

FIGS. 10A-10B illustrate policy instructions in CLI format according to an embodiment. The instructions may be provided and configured by the operator. The policy instructions may be stored in the iMOD database and the iMOD entity may control and instruct the network according to these policy instructions. More specifically, FIG. 10A illustrates a policy for all PGWs written in CLI format. FIG. 10B illustrates a policy to allocated the MME to a local eNB (e.g., serving eNB or nearest eNB) for all US customers to provide very fast (e.g., low latency) and high quality signaling according to an embodiment. The signaling for all other customers may be routed through the core and, therefore, may be slower or may experience delays. The policy is, again, written in CLI format.

FIG. 11 illustrates a protocol diagram of an embodiment communications sequence for implementing an iMOD policy configuration. The top portion of FIG. 11 shows the communication sequence when the eNB does not support a local MME function and the bottom portion of FIG. 11 shows the communication sequence when the eNB supports the local MME function.

The iMOD presenter (through the iMOD entity) installs an initial trigger notification for network discovery in the feeder element (Feeder MEE LB). Based on this trigger notification, the Feeder MME LB provides the iMOD entity (e.g., iMOD presenter) with trigger notification updates for new eNBs with their global eNB identifier, PGW, etc.

With reference to FIG. 11, the iMOD presenter sends a specific policy configuration to the Feeder MME LB. For example, the feeder MME LB has been instructed to provide a local MME for US customers according to FIG. 10B but no local MME for non-US customers. When the eNB sends an attach request for a subscriber with IMSI 310* (e.g., a US customer), the trigger condition is met (trigger is activated) at the feeder MME LB and an acknowledgement (e.g., a notification) is sent to the iMOD entity indicating that the trigger has been activated.

However, for new eNBs, the Feeder MME LB does not know whether the new eNB supports a local MME. The Feeder MME forwards the request to a regular MME. The Feeder MME LB then connects to the new eNB to query its capabilities, e.g., whether or not the new eNB support a local MME. Upon the query, the new eNB provides the Feeder MME LB with the information whether or not it supports local MME. When the next subscriber request comes in, the Feeder MME LB forwards the request when the request matches the policy.

If the Feeder MME LB knows that the eNB does not support a (local) MME function, then the request is sent through to the normal MME (MME function located at the core). However, if the eNB (e.g., eNB-MME supports a MME function, then the MME LB forwards the Attach Request to the local MME on the eNB. The eNB then handles signaling through the local MME. FIG. 11 illustrates a policy configuration for a Programmatically Intelligent Module Function Distribution Policy. In an embodiment, this iMOD Policy Configuration can be used to programmatically implement an iMOD Presenter API.

FIG. 12 illustrates an iMOD policy configuration for a complex policy written in C format according to an embodiment. FIG. 12 illustrates a protocol diagram of an embodiment communications sequence for implementing an iMOD policy configuration. This is the same policy as shown in FIG. 10B but only written in C format.

Figure 13:
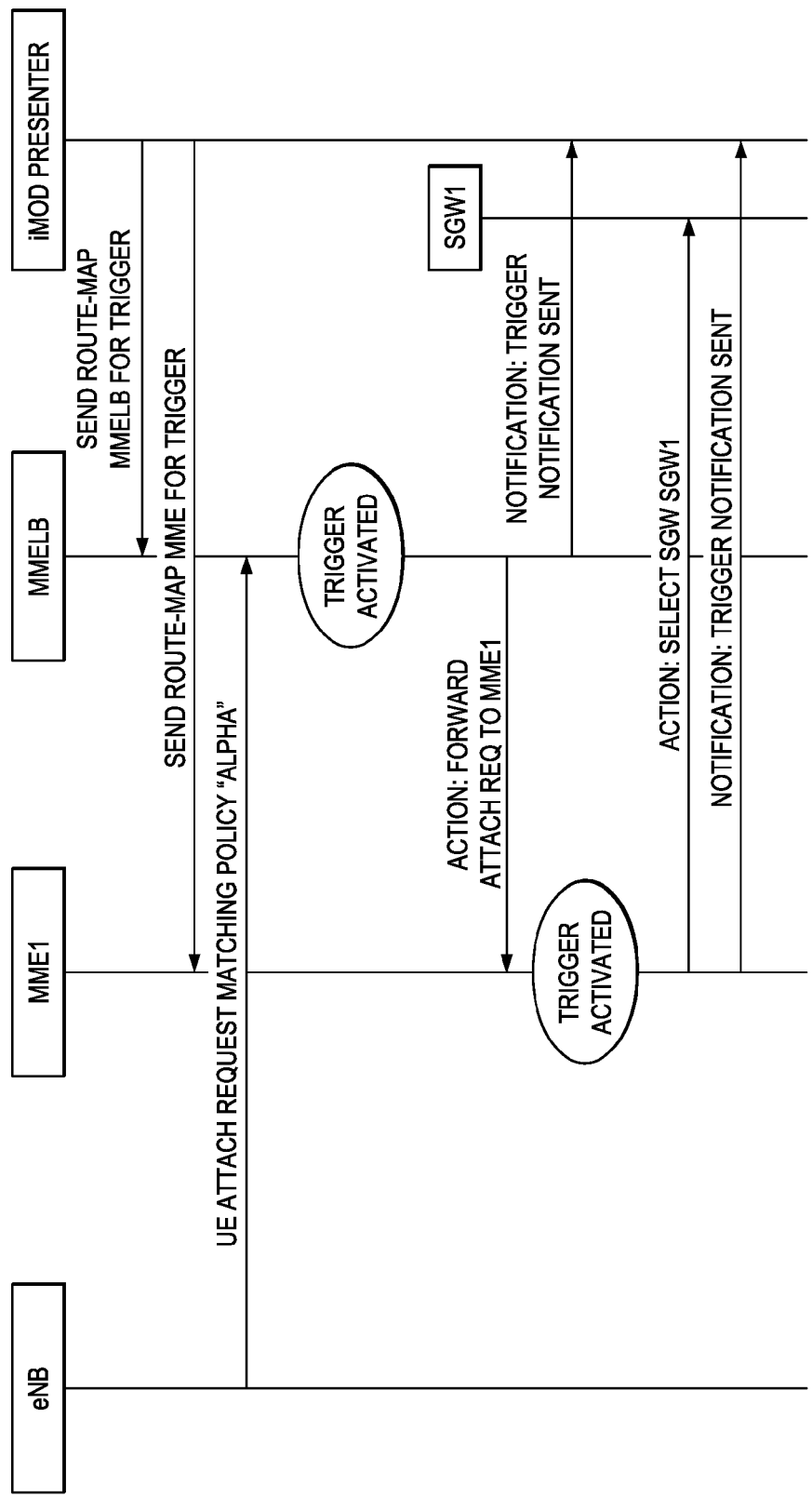
FIG. 13 illustrates a protocol diagram of an embodiment communications sequence for implementing an iMOD policy configuration.

FIG. 13 illustrates a protocol diagram of an embodiment communications sequence for implementing an iMOD policy configuration. As shown, the MME LB and MM1 were instructed by the iMOD entity (through the presenter). Route-map messages were sent from the iMOD entity to the MME LB and the MME-1. The eNB sends a UE attach request to the MME LB. A trigger is activated at MME LB when the UE meets the policy condition "alpha." The MME LB sends an action message to the MME-1 and a notification (acknowledgement) to the iMOD entity. A trigger is activated at MME-1 and the MME-1 sends an action message to the SGW-1 and a notification message to the iMOD entity.

Figure 14:
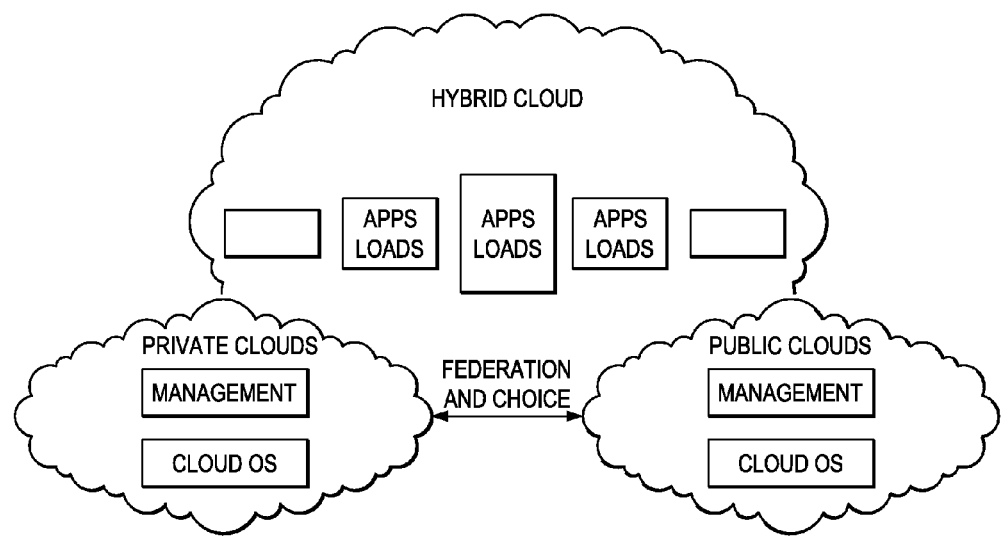
FIG. 14 illustrates a diagram demonstrating how iMOD can be used for mobile networks in a hybrid cloud network.

FIG. 14 illustrates a diagram demonstrating how the iMOD entity can be used in a mobile private cloud computing network or mobile hybrid cloud computing network. In an embodiment, a network operator may need to move virtual machines (VMs) from private cloud to public cloud (maintenance, emergency, etc.). In some embodiments the VMs share physical hardware resources and infrastructure but isolates the operating system and the application to avoid changing the end user experience. Since moving the VM is a L3 move, network disruption may occur to sessions. The iMOD entity may reduce network disruption by instructing the MME to break existing sessions and then connect to new PGW. Other configurations are also possible.

Cloud resources are usually not only shared by multiple users (functions) but are also dynamically reallocated per demand. This can work for allocating resources to different network functions. For example, cloud resources can be used for one function at one time at for other function at other times. The iMOD entity may generate PGWs and SGWs at remote locations (base stations or a pools of base stations) if necessary from the public cloud network. These PGWs/SGWs may be removed when not needed anymore, e.g., when the traffic slows down.

The iMOD entity may generate/delete these PGWs/SGWs dynamically whenever traffic passes in upward direction or downward direction a certain threshold or threshold band.

Figure 15:
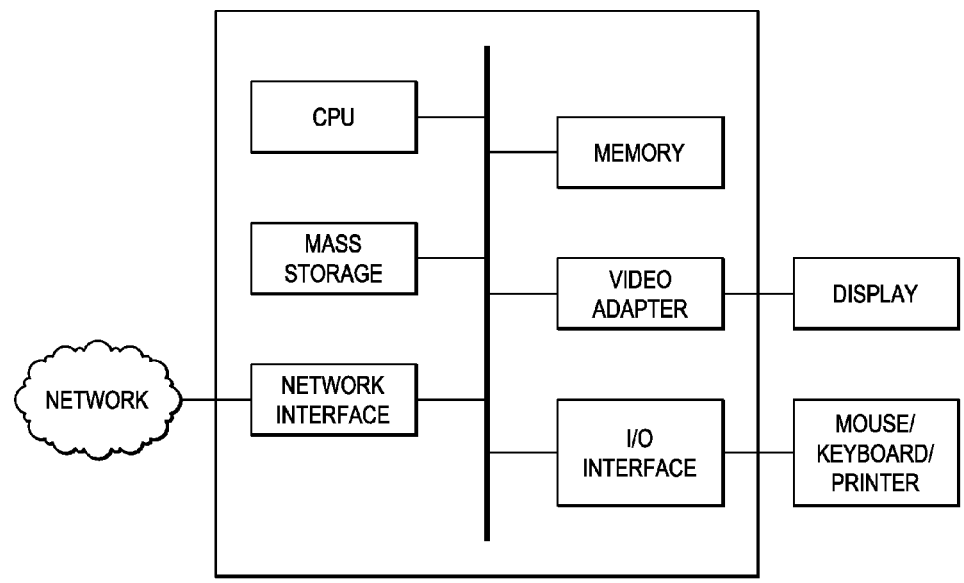
FIG. 15 illustrates a computing platform that may be used for implementing, for example, the devices and methods described herein, in accordance with an embodiment.

FIG. 15 is a block diagram of a processing system (such as an iMOD entity) that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

The following references are related to subject matter of the present application. Each of these references is incorporated herein by reference in its entirety:

Cost IC1004 White Paper on Scientific Challenges towards 5G mobile communications.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   discovering, by an Intelligent Mobile Function Distribution (iMOD) entity, bandwidth constrains in a first geographical location but not in a second geographical location in close proximity to the first geographical location of a mobile network; and
   dynamically limiting, by the iMOD entity, mobile functions at the first geographical location but not at the second geographical location, thereby allowing the mobile network to adapt to changing conditions.

2. The method according to claim 1, wherein dynamically limiting the mobile functions comprises instructing a PGW to compress video data with a first compression factor when an UE is in the first geographical location and to compress the video data with a second compression factor when the UE is in the second geographical location, and wherein the first compression factor is higher than the second compression factor.

3. The method according to claim 2, wherein the first compression factor is 5-10 times higher than the second compression factor.

4. The method according to claim 2, wherein dynamically limiting the mobile functions comprises instructing the PGW to compress the video data with a lower compression factor in the first geographical location when the bandwidth constrains have eased.

5. The method according to claim 1, wherein the first geographical location is a stadium and the second geographical location is a parking lot or restaurant in close proximity to the stadium.

6. A method comprising:
   assigning, by a Mobility Management Entity load balancer (MME LB), a first User Equipment (UE) to a MME-1 when the first UE satisfies a first policy so that the MME-1 selects a first sub mobile function and the first sub mobile function processes user data for the first UE; and
   assigning, by the MME LB, a second UE to a MME-2 when the second UE satisfies a second policy so that the MME-2 selects a second sub mobile function and the second sub mobile function processes user data for the second UE,
   wherein the first sub mobile function processes the user data for the first UE faster than the second sub mobile function processes the user data for the second UE based on a complex policy comprising the first policy and the second policy.

7. The method according to claim 6, wherein the first sub mobile function is located at a base station remote from a core of a mobile operator's network while the second sub mobile function is located at the core.

8. The method according to claim 6, wherein the first sub mobile function comprises a SGW-1, and wherein the second sub mobile function comprises a SGW-2.

9. The method according to claim 6, wherein the first sub mobile function comprises a PGW-1, and wherein the second sub mobile function comprises a PGW-2.

10. A method comprising:
   discovering, by an Intelligent Mobile Function Distribution (iMOD) entity, bandwidth constrains in a first geographical location of a mobile network but not in a second geographical location of the mobile network, wherein the second geographical location is in close proximity to the first geographical location; and
   dynamically limiting, by the iMOD entity, mobile functions at the first geographical location but not at the second geographical location, thereby allowing the mobile network to adapt to changing conditions,
   wherein dynamically limiting the mobile functions further comprises dynamically limiting the mobile functions for a User Equipment (UE) when the UE satisfies a first policy and not dynamically limiting the mobile functions for a further UE when the further UE satisfies a second policy.

* * * * *